United States Patent

Frantz et al.

[15] 3,670,091

[45] June 13, 1972

[54] ENCAPSULATED ELECTRICAL COMPONENTS WITH PROTECTIVE PRE-COAT CONTAINING COLLAPSIBLE MICROSPHERES

[72] Inventors: Franklin D. Frantz, Woodford, Vt.; Salvatore J. Acello, Sharon Springs, N.Y.; Harold I. Geller, Nashua, N.H.

[73] Assignee: Sqrague Electric Company, North Adams, Mass.

[22] Filed: May 20, 1971

[21] Appl. No.: 145,365

[52] U.S. Cl. ....................174/52 PE, 161/DIG. 5, 264/272, 264/DIG. 6, 338/257

[51] Int. Cl. ....................H05k 5/06

[58] Field of Search ....................174/52 PE; 317/234 E, 242; 336/96; 338/256, 257, 275; 161/DIG. 5; 264/255, 272, DIG. 6

[56] References Cited

UNITED STATES PATENTS

| | | | |
|---|---|---|---|
| 2,743,308 | 4/1956 | Bardsley | 174/52 PE |
| 2,978,340 | 4/1961 | Veatch et al. | 264/DIG. 6 |

FOREIGN PATENTS OR APPLICATIONS

| | | | |
|---|---|---|---|
| 749,370 | 5/1956 | Great Britain | 264/272 |
| 827,955 | 2/1960 | Great Britain | 174/52 PE |
| 907,995 | 10/1962 | Great Britain | 317/234 E |

*Primary Examiner*—Laramie E. Askin
*Attorney*—Connolly & Hutz and Vincent H. Sweeney

[57] ABSTRACT

A compressible medium is dispersed throughout a somewhat flexible matrix, so as to provide a pre-coat for encapsulated electrical components that reduces the stresses occurring thereon. The stresses relieved could be produced either from the component or from the outer encapsulant. The design of the system is such that the low pressures exerted during the application of the final coating do not substantially collapse or render useless the effective stress reducing characteristics of the intermediate pre-coat.

6 Claims, 1 Drawing Figure

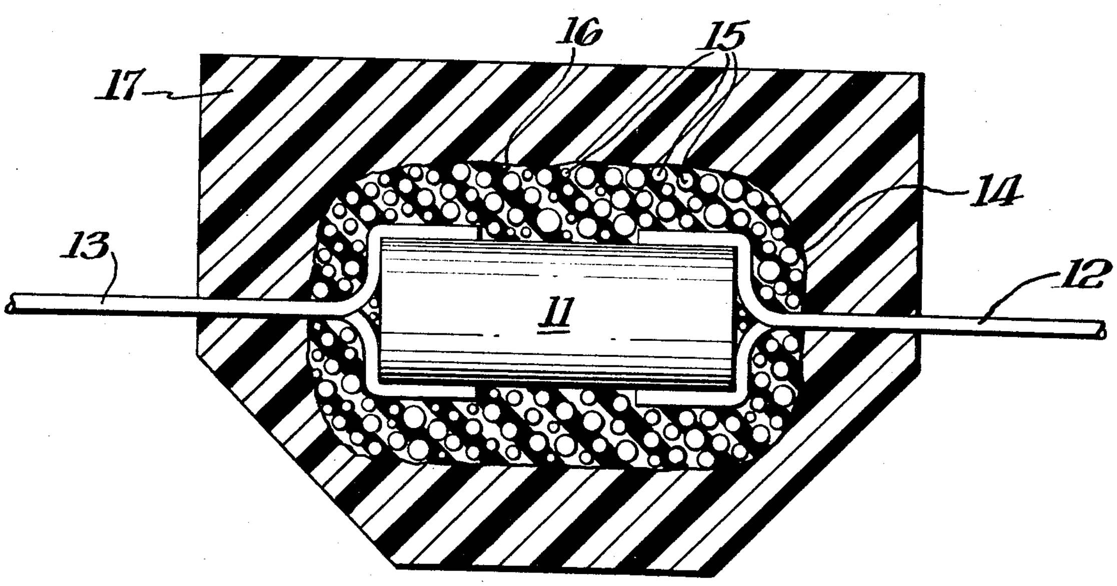
16
15
17
14
13
12
11

ENCAPSULATED ELECTRICAL COMPONENTS WITH PROTECTIVE PRE-COAT CONTAINING COLLAPSIBLE MICROSPHERES

BACKGROUND OF THE INVENTION

This invention relates to a protective pre-coat for encapsulated electrical components and more particularly to a compressible and protective pre-coat for encapsulated electrical components.

In order to protect many electrical components from the adverse effects of moisture and other contaminants in the atmosphere, and to provide resistance to mechanical shock in use and handling, the components have been encapsulated with some sort of protective material. However, when an electrical component is completely encapsulated by a material whose thermal or chemical shrinkage is different from that of the component, a condition of stress occurs. Such stresses may cause cracking of the outer encapsulating material and/or the component, or may cause other detrimental effects.

Prior art attempts to overcome this problem include the use of a layer of an elastomeric material between the component and the encapsulating outer layer. A typical elastomeric material is a silicone elastomer. However, since most elastomers are virtually incompressible, a great reduction of stress does not occur. Also such compounds are expensive, difficult to apply, have fair temperature cycling ability, and are non-wettable by other encapsulating resins. Polyurethane resins have been used in foam form to serve as an intermediary protective layer with some success. However, polyurethane foams are sometimes difficult to work with and it is difficult to get a closed cell when using these foams on miniature electrical components.

Accordingly, it is an object of the present invention to provide a compressible, stress relieving layer between the electrical component and the outer encapsulating material that is relatively inexpensive and easy to apply.

It is another object of this invention to provide a stress relieving intermediary layer that has a good low temperature cycling ability.

It is a further object of the present invention to provide a compressible intermediary layer that is wettable by outer encapsulating materials.

SUMMARY OF THE INVENTION

A compressible medium, such as air, is enclosed within phenolic spheres or hollow glass spheres, and is dispersed throughout a somewhat flexible matrix so as to provide an intermediary layer for encapsulated electrical components that will relieve any stresses brought to bear on either the encapsulant or the component. The flexible matrix is nearly saturated with microballoons or spheres, and the consistency of the resulting mixture approaches the point of dilatancy. The design of the system is such that the low pressures exerted during the final coating operation do not substantially collapse or render useless the effective stress reducing characteristics of this intermediary coat or layer. Any stresses on the spheres that cause a breaking of the spheres simply shifts the position of the air cell within the pre-coat layer so as to produce a continuous "air cushion" between the component and the encapsulant.

BRIEF DESCRIPTION OF THE DRAWING

The drawing is a cross-sectional view of an electrical component utilizing the pre-coat of the present invention.

DESCRIPTION OF THE PREFERRED EMBODIMENTS

When one body is completely encapsulated by another material whose thermal or chemical shrinkage is different, a condition of stress occurs. By the present invention, the stresses occurring herein are relieved or reduced by an "air cushion" formed between an electrical component and the encapsulating material.

The cushioning pre-coat or intermediary layer is formed by dispersing a compressible medium, such as air, that is contained in glass spheres or microballoons throughout a somewhat flexible matrix, such as a thermoset binder. This layer is designed in such a manner that even if the hollow spheres break when stress is applied thereto, a cushioning intermediary layer remains. This is so because the air released upon breaking the spheres displaces the volume held by the spheres and is retained within the layer between the component and the encapsulant, the encapsulant making an airtight enclosure around the component.

The spheres used herein should be of any collapsible or compressible material, such as glass, polystyrene, acrylonitrile-butadiene-styrene and phenolic compounds — generally any collapsible material can be used that has a compressive strength that is less than that of the other materials involved, but said compressive strength being at least 1,000 psi. Such materials are readily available through commercial outlets. The microballoons or spheres range in diameter size from approximately 10 microns to 250 microns, and the wall thickness of these spheres can be approximately 2 microns. The FIGURE illustrating this invention shows the differences in the relative sizes of the individual spheres. A ceramic capacitor 11 has copper terminals 12 and 13 extending therefrom, both being substantially completely surrounded with the protective pre-coat layer 14 of this invention in such a fashion that the extended portions of the terminals are not covered thereby. This layer is composed of hollow spheres 15 dispersed throughout a somewhat flexible matrix 16. The whole unit except for the extended portion of the terminals is then encapsulated with, for example, an epoxy resin 17 to complete the process.

The flexible matrix 16 could be a fusible powder or adhesive, a thermoset binder, a varnish, an epoxy binder or the like. It should be a material that bonds the small spheres filled with a compressible material together on the surface of the component so as to form a compressible porous layer.

The compressible medium within the spheres is most advantageously air, however, nitrogen, carbon dioxide, helium, and any other easily compressible material could be used, alternatively.

The flexible matrix should be nearly saturated with the spheres and the consistency of the resultant mixture should be nearly to the point of dilatancy so as to "lock" the spheres in place. Such a system will impede the dripping of this mixture off the component upon the application thereto when the units are allowed to dry. This is most advantageous as dripping causes weak spots to exist in a protective coating.

This pre-coat or intermediary layer may be applied in various ways depending on the materials used as the flexible matrix, and on the geometrical design of the component. If the component has radial leads, then the protective pre-coat layer may be most advantageously applied by dipping the component into the pre-coat mixture, and allowing the component to dry. If the design of the component is such that dipping process would be impractical, then the intermediary layer mixture may be applied by spraying, brushing, fountain coating or with a spatula. If the flexible matrix is, for example, a thermosetting binder, then, the resultant mixture could most advantageously be applied by a fluidized bed coating process wherein the components are pre-heated to 150°–180° C. prior to the application of the pre-coat mixture.

The thickness of the pre-coat intermediary layer depends on the type of component to which it is being applied, and the amount of protection needed therefor. Generally, it can be said that between 5 and 20 mils would be a sufficient thickness of the pre-coat layer for the purposes of this invention. The optimum thickness being approximately 10 mils.

Some typical examples of encapsulated bodies utilizing the pre-coat concept of this invention includes:

EXAMPLE I

Air-filled glass microspheres of approximately 10–30 microns diameter, and having a wall thickness of about 2 microns, are mixed with a varnish, so that the mixture is nearly saturated with the microspheres and has a consistency approaching the point of dilatancy. This varnish and microsphere mixture is then sprayed or brushed onto a ceramic capacitor having leads extending therefrom to give a pre-coat of about 10 mils thickness. Upon drying, the component is then encapsulated in an epoxy case, as by transfer molding. This unit has a lower temperature cycling ability that ranges from about −65° C. to +125° C., and has the ability to better withstand stresses acting thereon than prior art units.

EXAMPLE II

Air-filled phenolic microspheres of a maximum of 45 microns in diameter, and having a wall thickness of approximately 4 microns, are mixed with a fusible and heat curable epoxy powder system. The blend must be suitable for fluidization and applied as such, or by a powder jet or tumbling technique. Solid electrolyte capacitors having radial leads therefrom are pre-heated to approximately 160° C., and then dipped into a fluidized bed of the pre-coat mixture hereof, and allowed to dry. The capacitors are then further encapsulated with an epoxy resin to form electrical components that have a temperature cycling ability of at least −80° C. to +125° C. and that are better equipped to withstand any stresses applied thereto than prior art units.

The microsphere pre-coat is easy to apply, relatively inexpensive to use, and produces well protected electrical components that are wettable by other encapsulating materials.

The above-described specific embodiments of the invention have been set forth for the purposes of illustration. It will be apparent to those skilled in the art that various modifications may be made in the composition of the pre-coat without departing from the principles of this invention as pointed out and disclosed herein. For that reason, it is not intended that the invention should be limited other than by the scope of the appended claims.

What is claimed is:

1. An encapsulated electrical component comprising an electrical component having terminals extending therefrom, said component being substantially completely surrounded by a protective pre-coat layer comprising collapsible spheres containing a compressible medium dispersed throughout a flexible matrix capable of bonding said collapsible spheres to said electrical component, and an encapsulating material completely covering said pre-coat layer and said component.

2. The encapsulated electrical component of claim 1 wherein said compressible medium is air.

3. The encapsulated electrical component of claim 2 wherein said collapsible spheres have a compressive strength that is less than that of the encapsulant and the flexible matrix, but is at least 1,000 psi, and is of at least one collapsible material from the group consisting of glass, polystyrene, acrylonitrile-butadienestyrene and a phenolic compound; said flexible matrix is at least one member selected from the group consisting of thermosetting binders, varnish, and epoxy resins.

4. The encapsulated electrical component of claim 3 wherein said flexible matrix is nearly saturated with said collapsible spheres, and the resultant mixture therefrom has a consistency approaching the point of dilatancy; and said collapsible spheres have a diameter that ranges in size from 10 to 250 microns, and a wall thickness of approximately 2 microns.

5. The encapsulated electrical component of claim 4 wherein said collapsible spheres are of glass, and said flexible matrix is varnish.

6. The encapsulated electrical component of claim 4 wherein said collapsible spheres are of a phenolic compound, and said flexible matrix is an epoxy resin.

* * * * *